United States Patent
Schadler

(10) Patent No.: US 12,392,383 B2
(45) Date of Patent: Aug. 19, 2025

(54) ADJUSTMENT DRIVE

(71) Applicant: MAGNA Auteca GmbH, Weiz (AT)

(72) Inventor: Bernhard Hubert Schadler, Gersdorf an der Feistritz (AT)

(73) Assignee: MAGNA Auteca GmbH, Weiz (AT)

( * ) Notice: Subject to any disclaimer, the term of this patent is extended or adjusted under 35 U.S.C. 154(b) by 0 days.

(21) Appl. No.: 18/652,004

(22) Filed: May 1, 2024

(65) Prior Publication Data
US 2024/0410429 A1  Dec. 12, 2024

(30) Foreign Application Priority Data
Jun. 6, 2023 (EP) .................................. 23177444

(51) Int. Cl.
*F16D 43/208* (2006.01)
*F16D 43/26* (2006.01)
*F16D 127/06* (2012.01)

(52) U.S. Cl.
CPC .......... *F16D 43/208* (2013.01); *F16D 43/26* (2013.01); *F16D 2127/06* (2013.01); *F16D 2500/1023* (2013.01)

(58) Field of Classification Search
CPC .... F16D 43/208; F16D 43/26; F16D 2127/06; F16D 2500/1023; F16D 7/10
See application file for complete search history.

(56) References Cited

U.S. PATENT DOCUMENTS

2014/0157926 A1   6/2014  Fujisawa
2024/0410451 A1*  12/2024 Schadler ................. F16D 7/005

FOREIGN PATENT DOCUMENTS

EP  3483477 A1  5/2019
EP  3567277 A1  11/2019

OTHER PUBLICATIONS

European Patent Office search report for EP23177444.9, mailed Oct. 31, 2023.

* cited by examiner

*Primary Examiner* — Huan Le
(74) *Attorney, Agent, or Firm* — Jordan IP Law, LLC; Todd A. Vaughn

(57) ABSTRACT

An adjustment drive that includes an electric motor, a transmission having a self-locking transmission stage, an output, and a safety clutch having a free travel. The safety clutch is operable to separate, in an event of an excessive external torque introduced via the output, the self-locking transmission stage from the external torque. The adjustment drive also includes at least one compressible damping element arranged in the free travel to enable haptics of an external movement demand introduced via the output.

15 Claims, 1 Drawing Sheet

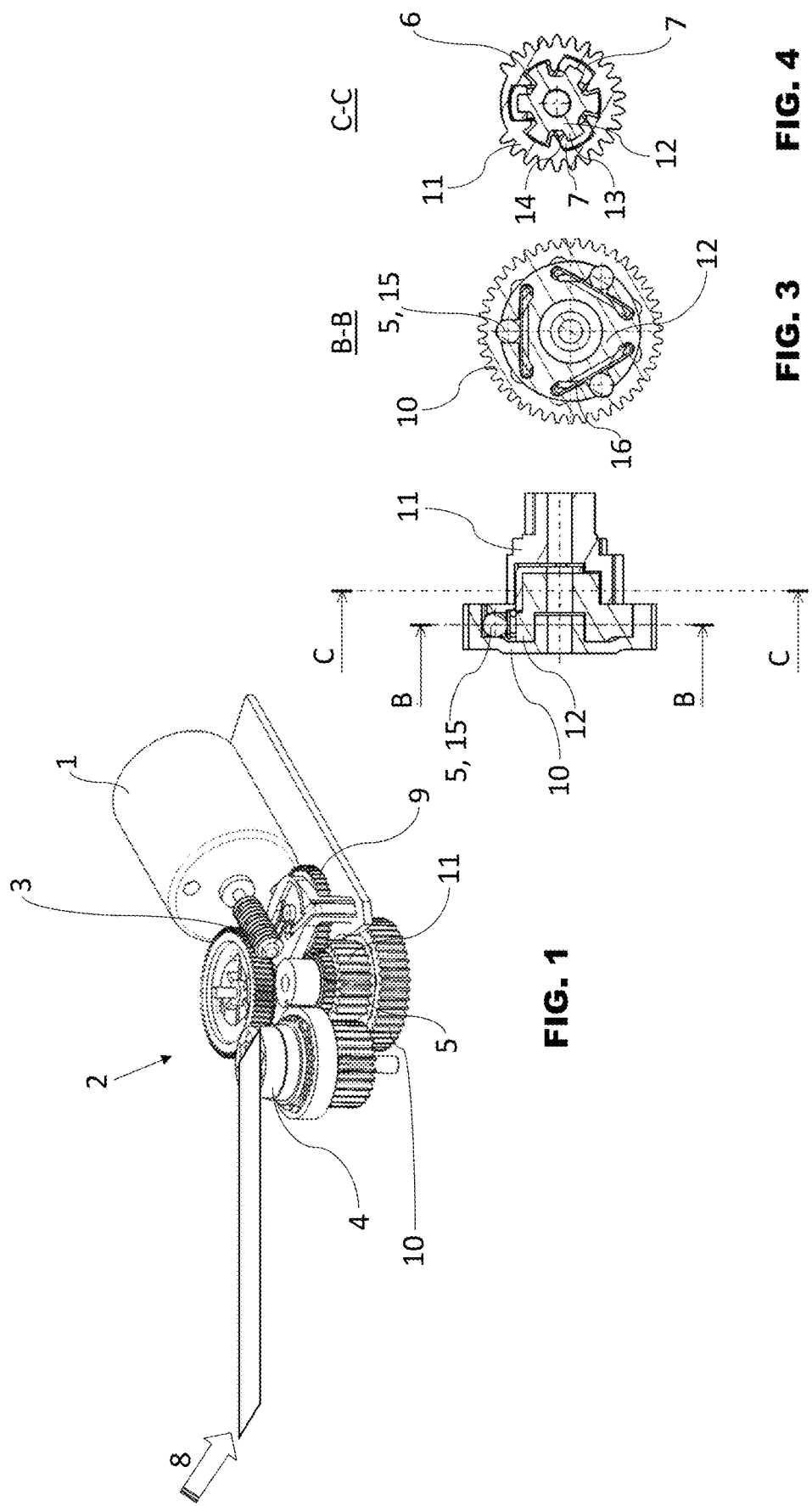

ADJUSTMENT DRIVE

CROSS-REFERENCE TO RELATED APPLICATIONS

The present application claims priority under 35 U.S.C. § 119 to European Patent Publication No. EP 23177444.9 (filed on Jun. 6, 2023), which is hereby incorporated by reference in its complete entirety.

TECHNICAL FIELD

The present disclosure relates to an adjustment drive comprising an electric motor and a transmission having a self-locking transmission stage, in particular, an adjustment drive in a motor vehicle.

BACKGROUND

It is known that adjustment drives are used in motor vehicles in order, for example, to actuate flaps or doors via an electric drive. Such adjustment drives usually use electric motors that are as small as possible, and often multistage transmissions to transmit the torque. Often, such multistage transmissions for adjustment drives use a self-locking transmission stage and thus form self-locking transmissions.

In order to protect a self-locking transmission from damage, it is often necessary to install a safety clutch, which, in the event of an excessive external torque, separates the self-locking transmission stage from the externally introduced torque. Specifically in the case of electric flaps, handles and doors, manual actuation (tip to run), which subsequently activates the electric mechanism (transmission), is also often provided. In general, the manual movement is detected by partial decoupling of the clutch in combination with angle measurement, and is processed as a movement demand on the motor.

The haptics of a manually induced movement (tip to run) are dependent on the clutch torque, and it is difficult to achieve a compromise between the haptics and the safety clutch for the protection of the transmission. Moreover, when using a standard transmission in various end-user applications, the safety-relevant component has to be repeatedly readjusted to the application in order to meet the haptic requirements.

SUMMARY

It is an object of the disclosure to improve an adjustment drive of the stated type in this respect and, in particular, to specify an adjustment drive, comprising an electric motor and a transmission having a self-locking transmission stage, which makes possible a safety clutch and desired haptics during a manual actuation (tip to run) and can be adapted in a flexible manner to various requirements.

The object is achieved by an adjustment drive comprising an electric motor and a transmission having a self-locking transmission stage and having an output, wherein the transmission comprises a safety clutch, which is configured, in the event of an excessive external torque, i.e., a torque introduced via the output, to separate the self-locking transmission stage from the external torque, wherein the safety clutch has a free travel, wherein at least one compressible and/or elastic and/or resilient damping element is arranged in the free travel, with the result that the haptics of an external movement demand, i.e., a demand introduced via the output, are co-determined or otherwise enabled by the damping element.

In accordance with the present disclosure, an adjustment drive has a safety clutch, which, in the event of an excessive external torque, can separate a self-locking transmission stage of the transmission of the adjustment drive from this external torque, i.e., opens in the event of a high applied torque. The safety clutch can be set up between two gearwheels of the transmission of the adjustment drive, in particular, between two coaxial gearwheels.

The adjustment drive furthermore has a free travel in order to absorb a movement demand from outside. The movement demand can be detected, and the electric motor and thus the adjustment drive can then be activated. Such a functionality is also referred to as a "tip to run" mechanism.

The disclosure envisages providing a damping element which damps the free movement in the free travel, at least in some section or sections. The damping element is a separate component. By using one or more separate damping elements of this kind, it is possible to selectively change and thus set the haptics of a movement request.

By using a clutch with a damped free travel integrated into the clutch, it is therefore possible to set the haptics of the induced movement for a respective mechanism independently of the decoupling function of the safety clutch.

The use of a separate damping element in the safety clutch makes it possible to implement various haptic variations without major expenditure since the safety-relevant function of the clutch is not affected by the haptic settings.

Refinements of the disclosure are specified in the dependent claims, the description and the appended drawings.

The adjustment drive preferably comprises an angle measuring sensor and a control unit, wherein the control unit and the angle measuring sensor are configured to ensure that the angle measuring sensor detects the external movement demand, and the control unit then activates the electric motor.

The safety clutch preferably comprises a motor-side gearwheel and an output-side gearwheel, as well as a connection element for connecting the motor-side gearwheel to the output-side gearwheel, wherein the connection element has a positive-locking connection to one of the two gearwheels, the motor-side gearwheel or the output-side gearwheel, in the closed state of the safety clutch, and wherein the connection element has the free travel and the damping element for the other of the two gearwheels, the output-side gearwheel or the motor-side gearwheel. Both the safety clutch and the free travel with damping are thus designed in such a way that they each act between the connection element and one of the gearwheels.

The motor-side gearwheel and the output-side gearwheel are preferably embodied at least in some axial section or sections as ring gears. The connection element is then preferably arranged radially inside the motor-side gearwheel and the output-side gearwheel.

The free travel is preferably formed by the fact that the connection element has radially outer raised portions, which lie in corresponding recesses in the motor-side gearwheel or in the output-side gearwheel, wherein the recesses are designed to be wider than the raised portions, and/or vice versa, such that the connection element has radially outer recesses, which surround corresponding raised portions on the motor-side gearwheel or on the output-side gearwheel, wherein the recesses are designed to be wider than the raised portions. The connection element can thus be of star-shaped or sun-shaped design, for example. The connection element can be arranged in the interior of one of the two gearwheels in such a way that there is a limited rotational play.

The at least one compressible and/or elastic and/or resilient damping element is preferably arranged in the interspace between a raised portion and a recess. As a particular preference, a plurality of compressible and/or elastic and/or resilient damping elements is arranged in the respective interspaces between a raised portion and a recess. The damping element or elements preferably has/have a U-shape and the damping element or elements lies/lie in a U-shape around the raised portions and/or in the recesses.

The safety clutch preferably uses clutch elements, in particular, balls, for a positive-locking connection between the motor-side gearwheel and the output-side gearwheel, wherein, in the event of an excessive external torque, i.e., a torque introduced via the output, the clutch elements are forced out of the positive-locking connection by the excessive torque, thus separating the self-locking transmission stage from the external torque. In this case, the positive-locking connection between the motor-side gearwheel and the output-side gearwheel does not have to be set up directly between the two gearwheels but can also be provided by an interposed connection element.

The clutch elements, in particular, balls, can be preloaded into the positive-locking connection, i.e., in the direction of the closing of the clutch, via spring elements.

The clutch elements, in particular, balls, are preferably arranged substantially in the connection element. Starting from the connection element and in the closed state of the clutch, the clutch elements can be supported in recesses in a surrounding gearwheel.

DRAWINGS

The disclosure is described by way of example below with reference to the drawings.

FIG. 1 is a three-dimensional illustration of an adjustment drive, in accordance with the present disclosure.

FIG. 2 is a sectioned side view of part of the transmission of the adjustment drive of FIG. 1, in accordance with the present disclosure.

FIG. 3 is a sectioned view according to section B-B of FIG. 2.

FIG. 4 is a sectioned view according to section C-C of FIG. 2.

DESCRIPTION

FIG. 1 illustrates an adjustment drive in accordance with the present disclosure, together with a movement request 8, i.e., an external torque, which can be applied from the outside, e.g. via a handle, to the output 4 of the adjustment drive.

The adjustment drive comprises an electric motor 1 and a transmission 2. The transmission 2, in turn, comprises a self-locking transmission stage 3, which can use a worm wheel for example, an output 4, via which an element to be adjusted, e.g. a flap, door etc., can be moved, and further transmission stages, which can lie between the self-locking transmission stage 3 and the output 4.

The transmission 2 comprises a safety clutch 5, which is configured, in the event of an excessive external torque, i.e., a torque introduced via the output 4, to separate the self-locking transmission stage 3 from the external torque. The safety clutch 5 is set up between two coaxial gearwheels, namely between a motor-side gearwheel 10 and an output-side gearwheel 11, of the transmission.

The adjustment drive furthermore comprises an angle measuring sensor 9 and a control unit (not shown), wherein the control unit and the angle measuring sensor 9 are configured to ensure that the angle measuring sensor 9 detects the external movement demand 8, and, if the movement demand 8 is sufficiently strong and the change in angle is sufficiently large, the control unit then activates the electric motor 1.

The motor-side gearwheel 10 and the output-side gearwheel 11, together with the safety clutch 5 and the free travel 6, are illustrated in greater detail in FIGS. 2 to 4. The motor-side gearwheel 10 and the output-side gearwheel 11 are embodied at least in some axial section or sections as ring gears, such that the connection element 12 can be arranged radially inside the motor-side gearwheel 10 and the output-side gearwheel 11.

As illustrated in FIG. 2, the safety clutch 5 is formed from a motor-side gearwheel 10 and an output-side gearwheel 11, and from a connection element 12 for connecting the motor-side gearwheel 10 to the output side gearwheel 11.

In the closed state of the safety clutch 5, the connection element 12 has a positive-locking connection to one of the two gearwheels 10, 11, namely to the motor-side gearwheel 10 in the illustrated embodiment, as can be seen in FIG. 3.

As is clearly visible in FIG. 3, the safety clutch 5 uses a plurality of circumferentially distributed clutch elements 15, namely three balls in the illustrated case, for a positive-locking connection between the motor-side gearwheel 10 and the output-side gearwheel 11, wherein, in the event of an excessive external torque, i.e., a torque introduced via the output 4, the clutch elements 15 are forced out of the positive-locking connection by the excessive torque, thus opening the clutch and separating the self-locking transmission stage 3 from the external torque. The clutch elements 15, namely balls, are arranged substantially in the connection element 12. The clutch elements 15, namely balls, are preloaded into the positive-locking connection, i.e., towards the closed state of the clutch, via clip-shaped spring elements 16.

In FIG. 4, it can be seen that the safety clutch 5 has a free travel 6, and three compressible and/or elastic and/or resilient damping elements 7 are arranged in the free travel 6. As a result, the haptics of an external movement demand 8, i.e., a movement demand introduced via the output 4, are co-determined or otherwise enabled by the damping element 7 or damping elements 7. The damping elements 7 are distributed circumferentially around the connection element 12 in at least some of the interspaces of the free travel 6.

The connection element 12 thus has the free travel 6 and the damping elements 7 in relation to the output-side gearwheel 11, in the broad sense that the connection element 12 has a decisive part in these functions.

To be more precise, the free travel 6 is formed by the fact that the connection element 12 has radially outer raised portions 13, in this embodiment six such portions, which lie in corresponding recesses 14 in the output-side gearwheel 11. The recesses 14 are designed to be wider than the raised portions 13.

The compressible damping elements 7 are arranged in the interspaces between in each case one raised portion 13 and one recess 14, which are formed by the width of the recesses 14. Viewed in the axial direction of the gearwheels, the damping elements 7 each have a U-shape and lie in a U-shape between the raised portions 13 and the recesses 14.

In order to protect a self-locking transmission from damage, a safety clutch 5 is thus installed. In order to detect a movement demand 8 (tip to run), an angle measuring sensor 9, e.g. a potentiometer or a Hall-effect sensor, is provided between the self-locking transmission stage 3 and the drive-side gearwheel 10 of the clutch 5. To enable the haptic requirements of the movement demand (tip to run) to be set, a free travel 6 with damping, namely with damping elements 7, is provided in the clutch 5.

The free travel 6 allows rotation of the driven-back gearwheel on the output side 11 relative to the connection element 12 without activating the decoupling mechanism of the safety clutch 5.

The damping element 7 is embodied so as to be compressible or resilient and generates a counter-torque that determines the haptics during the manually induced movement demand 8 (tip to run), and furthermore prevents loose free play in the output.

Should a person exert torque on the component, e.g. a flap, a handle or the like, connected to the output gear 4, this component can give way according to the hardness of the damping element 7 and the size of the free travel 6. The rotation of the output which occurs during this process can be detected via an angle sensor 9 and used as a prompt for an electric adjustment.

LIST OF REFERENCE SIGNS

1 Electric motor
2 Transmission
3 Self-locking transmission stage
4 Output
5 Safety clutch
6 Free travel
7 Damping element
8 Movement demand
9 Angle measuring sensor
10 Motor-side gearwheel
11 Output-side gearwheel
12 Connection element
13 Raised portion
14 Recess
15 Clutch element
16 Spring element

What is claimed is:

1. An adjustment drive, comprising:
an electric motor;
a transmission having a self-locking transmission stage, an output, and a safety clutch having a free travel and is operable to separate the self-locking transmission stage from the external torque, in an event of an excessive external torque introduced via the output, the safety clutch including a motor-side gearwheel, an output-side gearwheel, and a connection element operable to connect the motor-side gearwheel to the output-side gearwheel, the connection element having a positive-locking connection to one of the motor-side gearwheel or the output-side gearwheel in a closed state of the safety clutch; and
at least one compressible damping element arranged in the free travel to enable haptics of an external movement demand introduced via the output, wherein the connection element has the free travel and the damping element for the other of the output-side gearwheel or the motor-side gearwheel.

2. The adjustment drive of claim 1, further comprising:
an angle measuring sensor operable to detect the external movement demand; and
a control unit operable to activate the electric motor in response to the detection of the external movement demand.

3. The adjustment drive of claim 1, wherein the motor-side gearwheel and the output-side gearwheel comprise ring gears, at least in some axial sections.

4. The adjustment drive of claim 3, wherein the connection element is arranged radially inside the motor-side gearwheel and the output-side gearwheel.

5. The adjustment drive of claim 4, wherein the free travel is defined by radially outer raised portions of the connection element.

6. The adjustment drive of claim 5, wherein the radially outer raised portions lie in corresponding recesses in the motor-side gearwheel or in the output-side gearwheel.

7. The adjustment drive of claim 6, wherein the recesses have a width that is greater than a width of the radially outer raised portions to define radially outer recesses of the connection element which surround corresponding raised portions on the motor-side gearwheel or on the output-side gearwheel.

8. The adjustment drive of claim 7, wherein the at least one compressible damping element has a U-shape that is arranged in a corresponding interspace between a raised portion and a recess.

9. The adjustment drive of claim 7, wherein the at least one compressible damping element is arranged around the raised portion in the recess.

10. The adjustment drive of claim 1, wherein the safety clutch includes clutch elements comprising balls to enable a positive-locking connection between the motor-side gearwheel and the output-side gearwheel.

11. The adjustment drive of claim 10, wherein the output is operable to, in an event of an excessive external torque introduced via the output, force out the clutch elements from the positive-locking connection by the excessive torque, to thereby separate the self-locking transmission stage from the external torque.

12. The adjustment drive of claim 11, wherein the safety clutch includes spring elements to preload the clutch elements into the positive-locking connection.

13. The adjustment drive of claim 11, wherein the clutch elements are arranged in the connection element.

14. An adjustment drive, comprising:
an electric motor; and
a transmission that includes a self-locking transmission stage, an output, and a safety clutch operable to separate the self-locking transmission stage from the external torque in an event of an excessive external torque introduced via the output, wherein the safety clutch includes a motor-side gearwheel, an output-side gearwheel, a connection element operable to connect the motor-side gearwheel to the output-side gearwheel, the connection element having a radially outer raised portion arranged in a corresponding recess in the output-side gearwheel, and a compressible damping element arranged between the radially outer raised portion and the recess to enable haptics of an external movement demand introduced via the output.

15. An adjustment drive, comprising:
an electric motor; and
a transmission that includes a self-locking transmission stage, an output, and a safety clutch operable to separate the self-locking transmission stage from the external torque in an event of an excessive external torque introduced via the output, wherein the safety clutch includes a motor-side gearwheel, an output-side gearwheel, a connection element operable to connect the motor-side gearwheel to the output-side gearwheel, the connection element having a radially outer raised portion arranged in a corresponding recess in the output-side gearwheel, and a compressible damping element arranged between the radially outer raised portion and the recess to enable haptics of an external movement demand introduced via the output;
a sensor operable to detect the external movement demand; and
a control unit operable to activate the electric motor in response to the detection of the external movement demand.

* * * * *